United States Patent

[11] 3,633,695

[72] Inventor Chester D. Bradley
 Darien, Conn.
[21] Appl. No. 59,629
[22] Filed July 30, 1970
[45] Patented Jan. 11, 1972
[73] Assignee The A. H. Emery Company
 New Canaan, Conn.

[54] SIMPLIFIED HYDRAULIC LOAD CELL CONSTRUCTION
 14 Claims, 4 Drawing Figs.
[52] U.S. Cl. .................................................. 177/208
[51] Int. Cl. .................................................. G01g 5/04
[50] Field of Search ........................................ 177/208,
 254; 73/141 A

[56] References Cited
 UNITED STATES PATENTS
2,561,321 7/1951 Tate ........................... 177/208 X 2,960,328 11/1960 Tate ........................... 177/208 UX
3,145,795 8/1964 Tate ........................... 177/208
3,177,958 4/1965 Link ........................... 177/208
3,261,417 7/1966 Golding ....................... 177/208

Primary Examiner—Richard B. Wilkinson
Assistant Examiner—George H. Miller, Jr.
Attorney—Blair, St. Onge and Mayers ABSTRACT: A hydraulic load cell of simplified construction has an upper lateral support structure for the piston which eliminates the need for clamping rings and bolts. The support structure comprises an upper bridge ring disposed between the cylinder and piston members and held by integral flanges on said members. The upper bridge ring, and the lower bridge ring where used, may each be provided with arcuate edges to improve cell accuracy. The cell may also be provided with a supplementary shield against contamination and a simplified loading head structure.

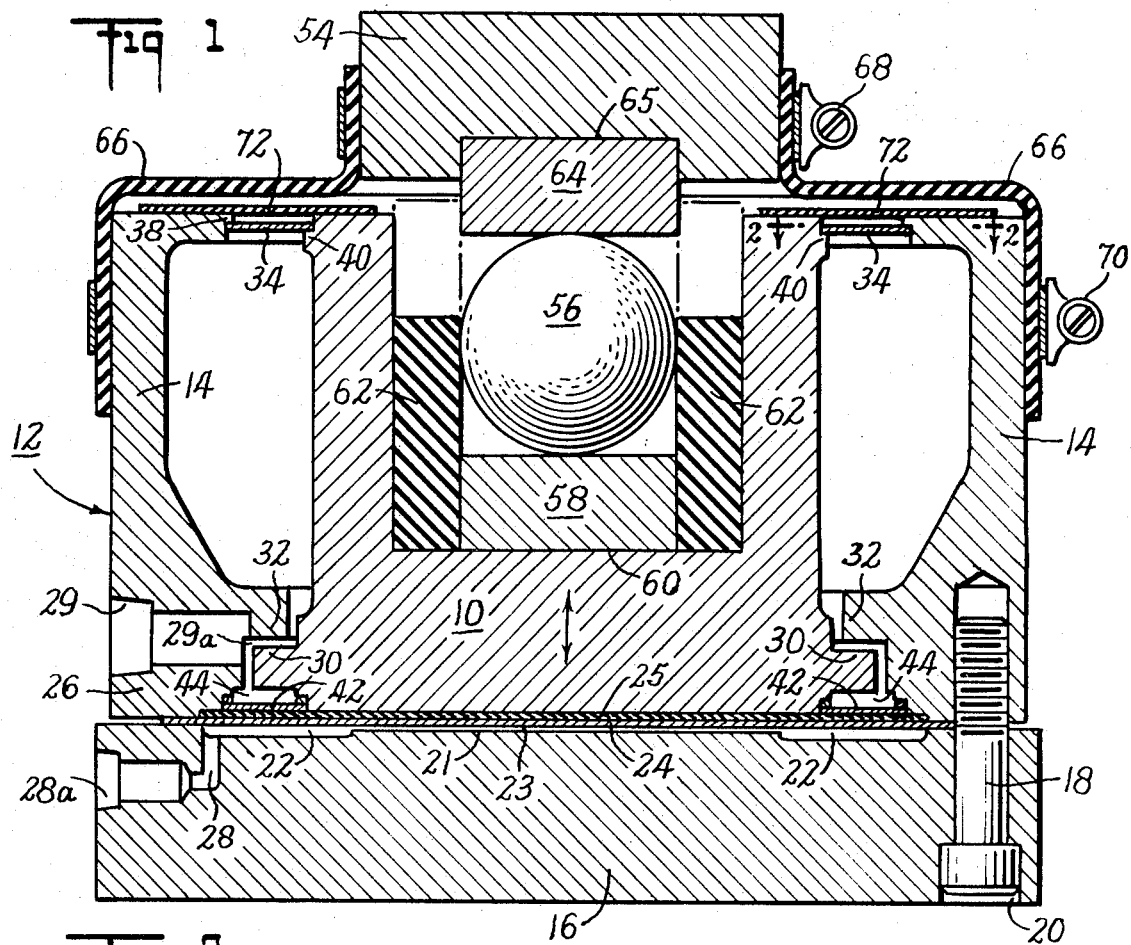
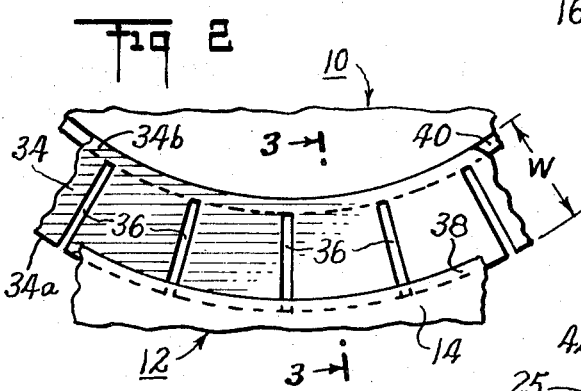
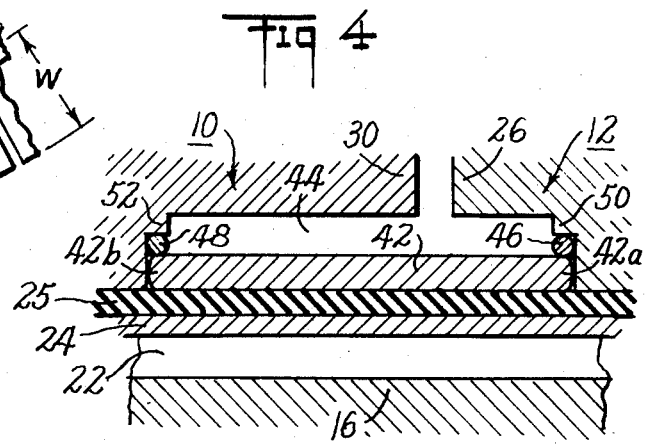
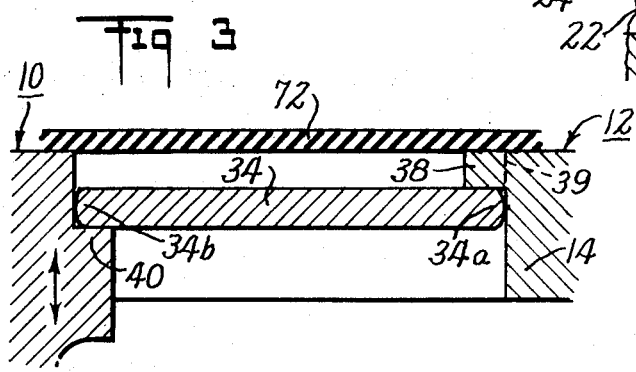
INVENTOR.
Chester D. Bradley
BY
Blair St.Onge + Mayers
ATTORNEYS

3,633,695

SIMPLIFIED HYDRAULIC LOAD CELL CONSTRUCTION

BACKGROUND OF THE INVENTION

Hydraulic load cells are now widely used for the weighing of large loads, and they are particularly advantageous for loads which do not lend themselves to weighing by more conventional beam scale-type weighing apparatus. For a general discussion of the structure and theory of operation of a modern hydraulic load cell see U.S. Pat. No. 2,960,328.

In a load cell of the general type described in the above-cited patent, the piston should move freely in an axial direction in the cylinder in response to loading if accuracy is to be maintained. To do this the piston should be supported within the cylinder in such a manner as to offset side thrusts or the effects of offcenter loading. These might otherwise cause the piston to bind against the cylinder wall. The support structure, however, should itself be substantially free from friction or binding so as not to impair accuracy. In prior cells such support has been provided by an annular stayplate, or in one case a stacked pair of annular bridge rings, interposed and clamped in position between the piston and cylinder walls at the upper end of the load cell, and by a single annular bridge ring similarly interposed but not clamped at the lower end of the cell resting over the diaphragm. While these structures have been generally satisfactory, constant efforts have been made over the years toward improvement.

The use of a clamped support structure at the upper end of the load cell has been an area of particular concern. Such a structure has typically required the use of a pair of clamping rings or the like, one being secured by bolts to the cylinder and the other similarly secured to the piston. The clamping rings have served to respectively clamp the inner and outer edges of the stayplate or upper bridge ring pair to the piston and cylinder members. Naturally, the necessity for separately machined clamping rings, numerous clamping bolts, plus the time and effort necessary to accurately position, tap and thread the holes required to receive the clamping bolts, has added significantly to the complexity and thus to the costs of manufacture and assembly of these prior art cells.

Accordingly, representative objects of the present invention are to provide an improved hydraulic load cell having a greatly simplified lateral support structure for the piston, and other improvements, yielding a less complex cell which is easier to manufacture and assemble, inexpensive, and having increased accuracy and reliability.

The invention accordingly comprises the features of construction, combination of elements, and arrangement of parts which will be exemplified in the construction hereinafter set forth, and the scope of the invention will be indicated in the claims.

SUMMARY OF THE INVENTION

The present invention relates to an improved hydraulic load cell of simplified construction, and more particularly to a load cell having an improved and simplified support structure for the piston utilizing an upper bridge ring in place of the prior art clamped stayplate, and other improvements.

The cell of the invention comprises a cylinder member in which a piston member is telescopically mounted for reciprocal axial movement. A lateral support structure is provided to keep the piston centered in the cylinder and prevent binding during its axial movement. Typically, the support structure comprises a lower bridge ring interposed between the piston and cylinder members and resting over the cell diaphragm. The lower bridge ring serves primarily to center the lower end of the piston and to support the diaphragm over the span between piston and cylinder. In some cells contemplated by the invention, however, the function of the lower bridge ring may be performed by other means. Accordingly, the upper bridge ring support structure described hereinafter is not strictly limited to use in cells employing a lower bridge ring.

The upper bridge ring serves to support the upper end of the piston; it is interposed between the piston and cylinder members and is supported by shoulders which are preferably integrally formed on the upper end of the piston and cylinder walls. No additional support beyond the shoulders is necessary for the upper bridge ring thus eliminating the need for separate clamping rings, bolts and the additional machining required in prior art cells.

The upper bridge ring is also preferably provided with rounded or arcuate inner and outer diameter edges. The use of arcuate edges eliminates sharp corners and thus allows the upper bridge ring edges to freely pivot in rolling manner against the contacting piston and cylinder wall when the bridge ring deflects in response to axial movement of the piston. Accordingly the chances of binding occurring between the upper bridge ring and either the piston or cylinder walls are minimized, and cell accuracy is improved.

The load cell may also be provided with a supplementary shield over the upper bridge ring to protect against contamination should the main protective boot of the load cell fail.

Prior art cells have previously employed arcuated inner and outer diameter edged on the lower bridge ring to improve accuracy. Preferably, the cell of the invention also uses such a lower bridge ring structure, in combination with the improved upper bridge ring previously described, to obtain optimum load cell performance.

The load cell may still further be provided with a loading assembly containing a rolling ball to accommodate offcenter loading or cross loads on the loading head. The loading assembly, however, is simplified in relation to those in some prior art cells in that the load blocks employed are freely supported. This eliminates the need for separate fastening bolts and the machining of holes to receive them.

BRIEF DESCRIPTION OF THE DRAWING

For a fuller understanding of the nature and objects of the invention, reference should be had to the following detailed description taken in connection with the accompanying drawing, in which:

FIG. 1 is a front elevation view in section of the improved hydraulic load cell of the invention.

FIG. 2 is a partial sectional view taken along line 2—2 of FIG. 1 and showing the upper bridge ring structure of the cell.

FIG. 3 is a greatly enlarged sectional view taken along line 3—3 of FIG. 2, the curvature of the upper bridge ring edges being exaggerated for illustrative purposes.

FIG, 5 is a greatly enlarged partial sectional view of a portion of the lower bridge ring structure as shown in FIG. 1, the curvature of the lower bridge ring edges being exaggerated for purposes of illustration.

Similar reference characters refer to similar parts throughout the several views of the drawing.

DESCRIPTION OF THE PREFERRED EMBODIMENT

Referring now to FIG. 1, the load cell comprises a piston member 10 mounted for reciprocal axial movement within a cylinder member 12. Cylinder member 12 comprises a cylindrical casing ring 14 mounted to a base 16 by a series of cap screws 18. Each cap screw 18 passes through a counterbored hole 20 in base 16 and into threaded engagement with casing ring 14. The upper surface of base 16 provided with an annular indentation 22 which defines a part of the pressure chamber of the load cell. A central plateau 21 is also provided on the upper surface of base 16. A diaphragm 24, preferably formed of flexible sheet metal such as stainless steel, is positioned over the upper surface of base 16 leaving a small space 23 between it and plateau 21. Diaphragm 24 thus overlies the cell pressure chamber which comprises indentation 22 and space 23. Diaphragm 24 is in turn covered except for the clamped outer edge thereof by a neoprene disc 25 to minimize friction with piston member 10. The outer edge of diaphragm 24 is then clamped in position adjacent the outer periphery of the cell between the base portion 26 of casing ring 14 and the upper surface of base 16 as shown in FIG. 1.

A passageway 28 is provided in base 16 in communication at one end with pressure chamber 22. At the other end 28a the passageway opens up to form an externally accessible connection. Passageway 28 and connection 28a serve two function in the cell. For one they provide a passage for filling pressure chamber 22 with a suitable hydraulic fluid. Once pressure chamber 22 is filled with fluid, connection 28a then serves as a means for connecting a suitable pressure-sensitive indicating instrument (not shown) to the cell. The indicating instrument then provides a readout means for indicating the magnitude of weight or force applied to the cell. A second passageway and connection similar to 28 and 28a may be provided in base 16 to act as an air vent when the cell is being filled with fluid. When all air bubbles are purged from the cell the vent is normally plugged and does not function during cell operation.

A further passageway 29 is provided into the cell through the side of the casing ting 14. Passageway 29 functions as a gauging hole to permit gauging of the cell by means of a feeler gauge inserted in the space 29a between flanges 30 and 32. Space 62a decreases as the cell fills with fluid and thereby permits determination of the fill of hydraulic fluid within the cell.

Piston 10 is generally cylindrical member having a circumferential flange 30 adjacent the bottom end thereof. It will be seen by reference to FIG. 1 that piston 10 is most readily mounted in casing ring 14 by inverting the casing ting and inserting the piston from the underside thereof until flange 40 rests against a corresponding casing ring flange 32.

the top end of piston 10 is maintained in a central piston in casing ting 14 and is braced against side thrusts by an upper annular bridge ring 34. Upper bridge ring 34 is preferably formed from a hardened steel and is provided with a series of slots 36 about its periphery as shown in FIG. 2. Slots 36 cut deeply into the bridge ring from the center diameter edge 34a thereof. Thus, the bridge ring 34 of formed as a plurality of individual segments which are connected by a relatively narrow band of metal adjacent to inner diameter edge 34b. Such a construction permits bridge ring 34 to readily flex during operation of the cell as will be understood from the following discussion, Referring back to FIG. 1, bridge ring 34 is supported adjacent the top of the load cell by shoulder support means which are preferably integral with casing ting 14 and piston member 10. The shoulder support means preferably comprise an integral shoulder 38 projecting from the inner wall of casing ring 14 and facing the bottom of the load cell in its normal operating position (FOG. 3). Shoulder 38 serves as an initial support for the upper bridge ring when the cell is assembled. Bridge ring 34 is insert edgewise into the top of casing ring 14 before it is inverted for further assembly, and then rotated to horizontal and held against shoulder 38 while the casing ring is inverted. To permit this slots 39 (FIG. 3) are provided in opposite sides of shoulder 38 to accommodate the edgewise insertion of bridge ring 34. when the diameter of flange 32 is large enough, bridge ring 34 may alternatively be dropped into position onto shoulder 39 when casing ring 14 is inverted for assembly.

Piston member 10 is likewise provided with an integral shoulder 40 on the outer surface thereof adjacent the top end. Shoulder 40, as shown in FIGS. 1 and 3, faces the top of the load cell in its normal operating position. As can be seen however, during assembly shoulder 40 will rest face down against bridge ring 34. However, when the load cell in in its normal operating portions as shown in FIGS. 1 and 3, shoulder 40 underlies the inner diameter edges 34b of upper bridge ring 34 and holds it up in position in the load cell structure. It should be noted that the supported edge of bridge ring 34 is the relatively rigid integral edge 34b. This is done to provide added strength. At the same time, shoulder 38 on casing ring 14 overlies the outer diameter edge 34b of bridge ring 34 and serves to prevent the bridge ring from being accidentally ejected from the top of the cell during operation.

As piston member 10 reciprocates axially within cylinder member 12, the reciprocating movement typically being on the order of a few thousandths of an inch, upper bridge ring 34 deflects slightly to accommodate such movement. During such deflection, the edges of the bridge ring are urged to pivot and/or slide on the adjacent piston and cylinder surfaces. The bridge ring has the same tendency to pivot or slide under the influence of heavy slide loading. It can be seen by reference to FIG. 3 that if the inner and outer diameter edges 34b and 34a of the bridge ring are flat, pivoting is restricted and the sharp corners thereof may dig into and bind on the adjacent piston and cylinder surfaces. Such binding may seriously impair the accuracy and reproducibility of the cell. Accordingly, as shown in FIG. 3, upper bridge ring 34 is preferably provided with arcuate surfaces on the outer and inner diameter edges 34a and 34b. The arcuate edges are preferably formed with a radius equal to one-half the width of the bridge ring "W" (FIG. 2). this insures that any movement of the bridge ring edges will be essentially pure rolling motion of the eliminating any vertical component. Thus, when the bridge ring 34 deflects in response to movement of piston member 10, the arcuate edges freely pivot in a rolling manner. This greatly reduces friction and eliminates the possibility of binding as would be the case with the sharp-edged bridge ring. The particular combination of deflection and pivoting which occurs in the upper bridge ring of the invention is hereinafter termed, in the specification and claims, pivotal deflection.

The bottom end piston 10 is also preferably supported by an annular bridge ring similar to upper bridge ring 34. This lower bridge ring further serves to support diaphragm 24 and neoprene disc 25 against the upward pressure of the hydraulic fluid. As shown in FIG. 1, lower bridge ring 42 rests on disc 25 over diaphragm 24 and extends up into a bridge ring aperture 44. Aperture 44 is defined under both flange 30 on piston member 10 and base portion 26 of casing ring 14 (FIG. 4). Preferably, lower bridge ring 42 is supported against the upward force due to pressure in chamber 22 by a pair of annular wires 46 and 48. Wires 46 and 48 are each positioned above lower bridge ring 42 and bear respectively against shoulders 50 and 52 formed in piston member 10 and casing ring 14. Wires 46 and 48, in effect, form substantially frictionless pivots for the deflection of bridge ring 42 during movement of piston member 10, and they help maintain the acting area of the cell constant. Lower bridge ring 42 is also preferably provided with arcuate outer and inner diameter edges 42a and 42b, the radii thereof also preferably being equal to one-half the width of the bridge ring. These edges permit lower bridge ring 42 to undergo pivotal deflection in substantially the same manner and for the same advantageous reasons as previously discussed for upper bridge ring 34.

Loads are applied to the load cell through a loading head 54 which is mounted at the top of the load cell as shown in FIG. 1. Preferably, loading head 54 is supported on a rolling ball 56 as shown. The loading head thus supported may either tilt or move from side to side to accommodate offcenter loading or cross loads. Ball 56 rests on a hardened steel load block 58 which is freely supported on the bottom of a centrally located recess 60 in piston member 10. Load block 58 and ball 56 are contained in a substantially centered position within recess 60 by surrounding resilient cylinder 62 which may be formed of neoprene or the like. Loading head 54 also carried a second load block 64 which is freely supported on the lower surface thereof. Load block 64 is preferably partially inserted into an aperture 65 which is formed in loading head 54 to keep the load block centered. As used herein in the specification and claims, the term freely supported as applied to the load blocks means that they are held in position without the use of cap screws or the like.

As shown in FIG. 1, resilient cylinder 52 extends over only a portion of the depth of recess 60 and partially encompasses ball 56. The use of a cylinder of this type permits maximum side to side movement of loading head 54. In those applications, however, where the side-to-side movement of loading head 54 is preferably inhibited, the height of resilient cylinder 62 may be extended as shown by the dotted lined in FIG. 1 to encompass at least a portion of the upper block 64.

The workings of the load cell may be seriously impaired by the intrusion of friction producing or corrosive contaminants Accordingly, a flexible protective boot 66 is secured over the top of the load cell by clamps 68 and 70 which are respectively secured about loading head 54 and casing ring 14. For added protection against contamination, however, a supplementary shield 72, comprising an annular elastomeric sheet, is preferably adhesively secured over upper bridge ring 34 to the top surfaces of casing ting 14 and piston member 10. Supplementary shield 72 thus serves to protect the moving parts of the load cell form contamination in the vent that protective boot 66 fails.

It will be thus seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which as a matter of language, might be said to fall therebetween, Having described my invention, what I claim as new and desire to secure by letters Patent is:

1. A hydraulic load cell of simplified construction comprising, in combination:
   A. a cylinder member having a pressure chamber in its base,
   B. a diaphragm extending across said chamber,
   C. a piston member reciprocally mounted in said cylinder,
   D. means providing lateral support for said piston member adjacent said diaphragm, and
   E. an annular upper bridge ring disposed for pivotal deflection between said cylinder and said piston members, said upper bridge and ring supported at a position spaced from said diaphragm by shoulder support means comprising a first shoulder around said piston member facing the top of said cell and underlying the inner diameter edge of said upper bridge ring, the upper surface of said upper bridge ring adjacent said inner diameter edge being unsupported, and a second shoulder around said cylinder surface facing the bottom of said cell and overlying the outer diameter edge of said upper bridge ring, the under surface of said upper bridge ring adjacent said outer diameter edge being unsupported.

2. A hydraulic load cell simplified construction comprising, in combination:
   A. a cylinder member having a pressure chamber in its base,
   B. a diaphragm extending across said chamber,
   C. a piston member reciprocally mounted in said cylinder,
   D. an annular lower bridge ring resting over said diaphragm and dispose between said cylinder member and said piston member and,
   E. an annular upper bridge ring having arcuate inner and outer diameter edges being disposed for pivotal deflection between said cylinder and piston members,
   a. said upper bridge ring being supported by first shoulder around said piston member facing the top of said cell and underlying the inner diameter edge of said upper bridge ring, the upper surface of said upper bridge ring adjacent said inner diameter edge being unsupported, and by a second shoulder around said cylinder facing the bottom of said cell and overlying the outer diameter edge of said upper bridge ring, the under surface of said upper bridge ring adjacent said outer diameter edge being unsupported.

3. A hydraulic load cell ad defined in claim 2 wherein said first and second shoulders are respectively integral with said piston and cylinder members.

4. A hydraulic load cell as defined in claim 2 wherein said arcuate inner and outer diameter edges have a radius equal to one-half the width of said upper bridge ring.

5. In a hydraulic load cell comprising a cylinder member having a pressure chamber in its base, a diaphragm extending across said chamber, a piston member reciprocally mounted in said cylinder, and an annular lower bridge ring resting over said diaphragm and disposed between said cylinder member and said portion member, the improvement comprising an annular upper bridge ring disposed for pivotal deflection between said cylinder and said piston members and being supported therein without clamping by shoulder means comprising a first shoulder around said piston member facing the top of said cell and underlying the inner diameter edge of said upper bridge ring, the upper surface of said upper bridge ring adjacent said inner diameter edge being unsupported, and second shoulder around said cylinder facing the bottom of said cell and overlying the outer diameter edge of said upper bridge ring, the under surface of said upper bridge ring adjacent said outer diameter edge being unsupported.

6. In a hydraulic load cell as defined in claim 5 having a protective flexible boot secured over said piston cylinder members to prevent intrusion of contaminants, the further improvement comprising a supplementary shield comprising an annular elastomeric sheet adhesively secured to the top surfaces of said piston and cylinder members over said upper bridge ring and serving to prevent the intrusion of contaminants should said boot fail.

7. A hydraulic load cell as defined in claim 5 including a passage means through said cylinder member and communicating with said pressure chamber, said passage means functioning both as a means for filling said pressure chamber with hydraulic fluid as a connection for an external pressure-sensitive indicating instrument.

8. A hydraulic load cell as defined in claim 5 wherein said first and second shoulders are respectively integral with said piston and cylinder members.

9. A hydraulic load cell as defined in claim 5 wherein said upper bridge ring has arcuate surfaces on the inner and outer diameter edges thereof to facilitate pivotal deflection and prevent binding.

10. A hydraulic load cell as defined in claim 9 wherein the radius of each of said arcuate surfaces is equal to one half the width of said upper bridge ring.

11. A hydraulic load cell as defined in claim 9 and further including arcuate surfaces on the inner and outer diameter edges of said lower bridge ring, said arcuate surfaces each having a radius equal to one-half the width of said lower bridge ring to facilitate pivotal deflection and prevent binding.

12. A hydraulic load cell as defined in claim 5 including a recess in said piston member, a resilient cylinder supported on the bottom of said recess and in substantially contiguous contact with the sidewall thereof, a first load block freely supported on the bottom of said recesses within said resilient cylinder, a loading head located above said piston, a second load block freely supported on the lower surface of said loading head over said first load block, and rolling ball disposed in said recess within said resilient cylinder in position to contact both said first and second load blocks during cell operation.

13. A hydraulic load cell as defined in claim 12 wherein the height of said resilient cylinder is substantially less than the depth of said recess to permit side-to-side motion of said loading head.

14. A hydraulic load cell as defined in claim 12 wherein said the height of said resilient cylinder is substantially equal to the depth of said recess and contiguously surrounds at least a portion of said second load block to inhibit side-to-side motion of said loading head.

* * * * *

UNITED STATES PATENT OFFICE
CERTIFICATE OF CORRECTION

Patent No. 3,633,695   Dated   January 11, 1972

Inventor(s)  Chester D. Bradley

It is certified that error appears in the above-identified patent and that said Letters Patent are hereby corrected as shown below:

Column 2, line 23, after "ring" insert --structure--; line 47, "5" should be --4--; line 62, after "16" insert --is--. Column 3, line 20, "62a" should be --29a--; line 22, after "is" insert --a--; line 25, "ting" should be --ring--; line 26, "40" should be --30--; line 29, "ting" should be --ring--; line 31, delete "a" first occurrence; line 33, "center" should be --outer--; line 34, delete "the"; "of" should be --is--; line 42, "ting" should be --ring--; line 46, "(FOG.3)" should be --(FIG.3)--; line 48, "insert" should be --inserted--; line 55, "39" should be --38--; line 62, "in" first occurrence should be --is--; line 63, "portions" should be --position--.  Column 4, line 6, "slide" should be --side--; line 17, "essentially" should be --substantially--; line 18, "the" should be --upper--; line 58, after "by" insert --a--; line 59, "carried" should be --carries--; line 67, "52" should be --62.  Column 5, line 9, "ting" should be --ring--; line 11, "form" should be --from--; line 13, "be thus" should be --thus be--; line 36, delete "and", and after "ring" insert --being--; lines 41, 42, delete "sur-face"; line 46, after "cell" insert --of--; line 55, "being" should be --and--.  Column 6, line 3, after "edges" insert --each--; line 10, "portion" should be --piston--; line 17, after "and" insert --a--; line 23, after "piston" insert --and--; line 30, delete "a"; line 34, after "fluid" insert --and--; line 54, "sidewall" should be --sidewalls--; line 58, after "and" insert --a--; line 65, delete "said".

Signed and sealed this 27th day of June 1972.

(SEAL)
Attest:

EDWARD M. FLETCHER, JR.
Attesting Officer

ROBERT GOTTSCHALK
Commissioner of Patents